United States Patent [19]

Sellers, Jr.

[11] 3,725,203

[45] Apr. 3, 1973

[54] BACTERIA IDENTIFICATION CULTURE MEDIUM

[75] Inventor: Walter M. Sellers, Jr., San Antonio, Tex.

[73] Assignee: Media Services, Inc., San Antonio, Tex.

[22] Filed: Feb. 5, 1971

[21] Appl. No.: 113,095

[52] U.S. Cl. .............................195/100, 195/103.5 R
[51] Int. Cl. .................................................C12k 1/00
[58] Field of Search........195/99, 100, 101, 102, 103, 195/103.5 R

[56] References Cited

OTHER PUBLICATIONS

Singer and Volcani, Journal of Bacteriology, vol. 69 pgs. 303–306 (1955)

Primary Examiner—A. Louis Monacell
Assistant Examiner—Robert J. Warden
Attorney—Arnold, White & Durkee, Tom Arnold, Bill Durkee, Jack C. Goldstein, John F. Lynch, Louis T. Pirkey, Frank S. Vaden, III and Robert A. White

[57] ABSTRACT

A culture medium which provides an environment for positive and nontransient identification of proteus and providence strains of enteric bacteria utilizes a combination of L-tryptophane with ferric ammonium citrate and brom cresol purple with the optional addition of L-phenylalanine in a slightly acid medium. The culture is also provided with a gelling agent such as agar in order to produce a slant and with nutrients for the bacteria. The combination of components may be incorporated into otherwise known culture media as well. When the combination is incorporated into slightly acid screening media such as lysine iron agar, a positive test for proteus and providence bacteria can be effected. When incorporated in other screening media such as Kligler iron agar or triple sugar iron agar which are slightly alkaline, this combination of ingredients improves the screening ability of these culture media although it does not provide a positive test for proteus and providence bacteria.

15 Claims, No Drawings

BACTERIA IDENTIFICATION CULTURE MEDIUM

BACKGROUND OF THE INVENTION

This invention relates to novel culture media to effect the growth and enable the identification of bacteria. More specifically, this invention provides a combination of culture media components which enable the preparation of a medium which will provide positive identification of enteric bacteria of the proteus and providence type, and which can be adapted to other known culture media to facilitate the identification of enteric bacteria.

Culture media for the identification of bacteria have long been known. Such culture media are employed in the diagnosis of illness since, in most instances, when the precise nature of an infecting bacteria is known, proper treatment can be directly prescribed by a physician.

Heretofore, a number of culture media have been used for the identification of enteric bacteria. These culture media are effective to provide identification of a number of enteric bacteria of the proteus or providence type. For example, phenylalanine agar has often been used for differentiation of enteric bacilli on the basis of their ability to produce phenylpyruvic acid by oxidation deamination of phenylalanine. The test for proteus and providence bacteria with phenylalanine agar is conducted by preparing slant cultures of the medium (i.e., permitting the medium to gel in an inclined tube so as to define a gelled phase which is slanted with respect to the tube), inoculating the slant with the unknown bacteria and incubating the medium at about 32° to 37° C for a number of hours. Following incubation, four or five drops of a 10% aqueous solution of ferric chloride is added to the slant and the immediate appearance of an intense green color indicates the presence of phenylpyruvic acid and is a positive indication of the presence of proteus or providence bacteria.

However, the green color indicating the positive result of the test can be extremely transient and hence requires close attention. Moreover, although the test is accurate for a large percentage of proteus and providence bacteria, there are some bacilli of this type which do not give a positive result.

Other culture media are also employed to identify proteus and providence type of bacteria, but phenylalanine agar is probably most preferred because only a very few strains of these bacteria will fail to give a positive test.

In addition, it has been reported by Singer and Volcani (J. Bacteriol. Vol. 69, p. 303, 1955) that tryptophane was useful in identifying proteus and providence bacteria in a procedure wherein isolated colonies of bacteria were inoculated on triple sugar iron agar slants, then washed off with a tryptophane solution and after agitation for an hour treated with a drop of ferric chloride and a drop of hydrochloric acid. Although this test was reportedly reliable, it did not provide a convenient test method. Furthermore, the test method relied upon color differentiation between orange red and cherry red and hence could lead to confusion and error.

SUMMARY OF THE INVENTION

Accordingly, there has been a need for a culture medium which will provide a permanent, positive reaction to indicate the presence of a wide spectrum of proteus and providence bacilli.

There is accordingly provided in accordance with one aspect of this invention a culture medium which can be adapted to slant cultures or Petri dish cultures and which will provide a permanent reaction indicating the presence of proteus or providence bacilli.

There is also provided by this invention a novel culture medium which, in experiments heretofore conducted, has given a positive reaction identifying all strains of proteus and providence bacteria which have been tested, including strains which produce no such positive reaction in the phenylalanine agar medium.

There is further provided by this invention a combination of components which can be added to other screening media such as Kligler iron agar, triple sugar iron agar, and lysine iron agar which improves the screening properties of these screening media.

The novel culture medium of this invention comprises the combination of L-tryptophane, ferric ammonium citrate and brom cresol purple maintained in an acid medium, having a pH of about 6.7. The medium is also provided with sources of nutrition to encourage growth of the bacteria in the medium and with a gelling agent, most typically agar to enable the preparation of slant cultures. Preferred as the bacteria nutrients are a peptone, such as bactopeptone to provide a source of nitrogen, and yeast extract. In a further refinement of this culture medium, a small amount of brom thymol blue may be added to the culture medium to accentuate the color reaction.

Since the most popular current medium for the identification of proteus and providence contains L-phenylalanine, it may be desirable to include phenylalanine in the medium since it produces a color reaction identical to that produced by L-tryptophane and does not interfere with the reaction. However, it would appear that some strains of bacteria which produce a positive reaction with tryptophane will not do so with phenylalanine, and hence the former is the essential ingredient of the culture media of this invention.

Upon inoculation and incubation of slants prepared with the medium of the invention, proteus and providence bacilli will produce a distinctively brown slant whereas no reaction will be produced, and the purple color will remain if the unknown culture did not include bacilli of these types. The reaction occurs in the slant of the cultures of this invention without addition of test reagents and without further intermediate treatment.

The components can also be adapted to other screening media to enhance the reaction of these screening media to proteus and providence bacilli. For example, the addition of L-tryptophane and L-phenylalanine to lysine iron agar (which typically contains ferric ammonium citrate and brom cresol purple) will provide a culture medium which produces all the known reactions typically expected of lysine iron agar, and also will produce a brown slant when inoculated with proteus or providence bacilli.

The addition of tryptophane, phenylalanine, ferric ammonium citrate and brom cresol purple to other screening media such as Kligler iron agar and triple sugar iron agar is also useful. These media have a pH in the alkaline range, however, and although modification of these media enhances their reaction to most proteus and providence strains by producing a brown slant, it has been found that this positive reaction is not so comprehensive and that some proteus strains which have a weak deaminating ability, e.g., some proteus morganii, fail to give a positive reaction.

DESCRIPTION OF THE SPECIFIC AND PREFERRED EMBODIMENTS

Identification of proteus and providence bacilli by known methods using phenylalanine or tryptophane in the culture proceeds because these bacteria contain an enzyme which catalyzes the oxidative deamination of these amino acids to the corresponding $\alpha$-keto acids. When proteus or providence bacilli are incubated with phenylalanine and then tested with a test reagent of ferric chloride, ferric ions react with phenylpyruvic acid formed from the phenylalanine to yield a green color which fades quickly. The identification of proteus and providence by known methods using tryptophane proceeds somewhat similarly with the ferric ions reacting with indolepyruvic acid formed from the tryptophane by the organisms.

In the instant novel culture media, these reactions take place in the presence of ferric ammonium citrate and brom cresol purple. With these additional components, there is formed a nonmetabolizable color complex with the indolepyruvic acid (and with the phenylpyruvic acid if phenylalanine is included), to thus provide a permanent color indication of the presence of proteus or providence bacilli.

In a first specific aspect, this invention provides a culture medium for identification of proteus and providence bacilli which has the following preferred formulation (the formulation below is in grams per liter of distilled water):

| | |
|---|---|
| Bactopeptone | 5.0 |
| Yeast Extract | 3.0 |
| L-tryptophane | 3.0 |
| L-phenylalanine | 2.0 |
| Ferric Ammonium Citrate | 0.5 |
| Brom Cresol Purple | 0.005 |
| Brom Thymol Blue | 0.010 |
| Agar | 15.0 |
| pH $\approx$ 6.7 (pH is adjusted by addition of a slight amount of a mineral acid such as hydrochloric acid). | |

The foregoing formulation is given for illustrative purposes only. For example, the bactopeptone and yeast extract are present primarily as nutrition sources for the bacteria. Bactopeptone provides a nitrogen source for the bacteria in the culture medium. Other peptone compounds such as polypeptone, gelysate peptone, and the like could also be used. Such peptones are well known by those skilled in the art of preparation of culture media and can be appropriately selected. The amount of bactopeptone may also be varied between about 2 and 20 grams per liter, as will be appreciated by those skilled in the art.

The yeast extract is also provided in the culture medium as a nutrition source, a vitamin source, and as a source of salts to the organisms. Beef extract is used in many media in place of yeast extract, but inasmuch as the beef extract tends to color the medium reddish brown, and might result in confusion in reading the medium's reaction to proteus or providence bacilli, yeast extract is preferred. Again, the amount can be varied, typically between about 1 and 5 grams per liter.

The essential amino acid, L-tryptophane, may also be provided in somewhat varying amounts. Typically from about 1 to about 5 grams per liter of L-tryptophane will be sufficient to produce the desired reaction to proteus and providence though up to 10 grams can be employed particularly if phenylalanine is not to be used. It is pointed out that the organisms will attack only the levorotatory forms of the acid, and accordingly, if the trytophane is to be added as D, L-tryptophane, it should be recognized that the mixture of dextrorotatory and levoratatory forms will contain only about 50% of the desired levoratatory amino acid.

The L-phenylalanine is included in the preferred embodiment of this invention. Phenylalanine is the most often used test for proteus and providence bacteria. If used, the phenylalanine is typically present in amounts ranging from 1 to 5 grams per liter of the levoratatory form.

The ferric ammonium citrate is typically added in amounts of less than a gram. As indicated above, one-half gram of ferric ammonium citrate is typically sufficient. If another iron salt is present, the ferric ammonium citrate may be present in small amounts of about 0.1 gram.

The brom cresol purple is added in extremely small amounts. It has been found that when brom cresol purple is added in amounts of 40 milligrams per liter, the brown indication of proteus and providence does not show up as distinctly as would be desirable. Accordingly, it is preferred to use brom cresol purple in amounts less than 40 milligrams per liter. The culture medium will give the desired reaction with brom cresol purple present in amounts as small as about one and one-half milligrams per liter.

A second color indicator, brom thymol blue is also added in a preferred embodiment of this invention. The brom thymol blue is added for purposes of accentuating the original purple coloration of the medium and heightening the color reaction. The brown color reaction to proteus or providence bacteria is improved by addition of this indicator. The brom thymol blue is not essential, however, and is added in small amounts, generally from about 2 to 15 milligrams per liter to accentuate the color reaction of the medium.

Slants of this culture medium can be prepared by methods well known to those skilled in the art. For example, components in the amounts as outlined above are added to a liter of distilled water which is boiled to dissolve the agar. The resulting mixture is placed in a tube and sterilized at 121° C at 15 p.s.i. for about 15 minutes. The tubes are then inclined and permitted to cool to produce a slant.

Alternatively, the medium can be prepared in a Petri dish. In such a procedure, the material is generally sterilized in bulk as above and is then delivered to individual sterile Petri dishes. The characteristic reaction of proteus and providence in a Petri dish is the same as in a slant — the medium surrounding the bacteria turns a chocolate brown color.

In preparation of the culture medium of this invention, the pH of the medium must be adjusted to be slightly in the acid range. It has been found that if the medium is maintained in the alkaline range, the comprehensibility of the medium to positively respond to all strains of proteus bacilli, including those which have a weak deaminating ability, is impaired. Any suitable mineral acid may be used to adjust the pH although, as is appreciated by the art, use of hydrochloric acid is preferred. Usually a small amount of hydrochloric acid in a liter of the solution containing the components of the medium is sufficient to produce the required pH.

It will be understood that the medium of this invention may be sold in dehydrated form as a powdered mixture of the various components. The medium may then be prepared by boiling the components in distilled water as indicated above to dissolve the same and proceeding with the sterilization and preparation of the slants or Petri dishes.

The novel culture medium of this invention may also be adapted to known screening media to enhance their ability to identify proteus and providence bacteria. For example, by addition of L-tryptophane to lysine iron agar, none of the classic reactions of the medium are impaired but an improved reaction to proteus and providence bacilli is obtained. Thus, for example, when using lysine iron agar prepared according to formulations known in the prior art, most proteus bacilli will cause the slant of this medium to turn reddish brown. The medium also can identify bacteria which produce hydrogen sulfide (the positive reaction being the formation of a black color at the bottom of the slant) and can identify bacteria which can decarboxylate lysine (the butt of the slant assumes a purple color if the organism can decarboxylate lysine but remains yellow if the organism cannot).

Lysine iron agar typically has a composition as follows (the formulation being given in terms of grams of each component per liter of distilled water):

| | |
|---|---|
| Gelysate Peptone | 5.0 |
| Yeast Extract | 3.0 |
| Dextrose | 1.0 |
| L-lysine | 10.0 |
| Ferric Ammonium Citrate | 0.5 |
| Sodium Thiosulfate | 0.04 |
| Brom Cresol Purple | 0.02 |
| Agar | 13.5 |
| pH ≈ 6.7 (adjusted with hydrochloric acid). | |

In accordance with this invention, the lysine iron agar can be modified to give a positive reaction to a broader scope of proteus and providence bacteria by addition of L-tryptophane in amounts varying from about 1 to 5 grams as pointed out above and addition of phenylalanine in similar amounts if desired. It is not necessary to add either ferric ammonium citrate or brom cresol purple to modify the lysine iron agar inasmuch as these components are typically already present. Preferably, the L-tryptophane and L-phenylalanine are added in amounts similar to the amounts given in the preferred composition above, and accordingly, to the lysine iron agar formulation as above, in a most preferred embodiment, there would be added (the formulation given in grams per liter of distilled water):

| | |
|---|---|
| L-tryptophane | 3.0 |
| L-phenylalanine | 2.0 |

The resulting modified lysine iron agar continues to give the identical reaction to bacteria capable of producing hydrogen sulfide and bacteria capable of decarboxylating lysine. However, the modified lysine iron agar will now produce a brown slant in the presence of proteus or providence bacilli. (Lysine iron agar, not modified in accordance with this invention, will produce a red-brown slant in the proteus and providence bacteria, but the reaction is not so comprehensive and some strains will escape identification.) Inasmuch as lysine iron agar is typically prepared at a pH of 6.7, the same pH as the culture medium of this invention, all proteus and providence bacilli tested have given the desired positive reaction, i.e., the brown slant, in this modified lysine iron agar. As will be seen below, if components of this invention are modified to other screening media which are typically maintained slightly in the alkaline range, that a very few strains of proteus bacteria, typically proteus morganii will not give a positive reaction.

In a final aspect of this invention, the components of the novel culture medium herein can be adapted to Kligler iron agar and triple sugar iron agar. In each instance, these culture media are known in the art and provide a number of reactions. Hence, they are used as screening media. By addition of tryptophane, ferric ammonium citrate (if necessary), and brom cresol purple and optionally phenylalamine as explained above to these media, their reaction to proteus and providence bacteria is enhanced. In each case, the reaction is the same as the foregoing media of this invention, that being that the slant turns a characteristic brown color in the presence of proteus or providence bacilli.

For example, Kligler Iron agar is available in various formulations depending upon the manufacturer from whom it is purchased. Two exemplary formulations are set forth below (formulation is given in grams per liter of distilled water):

Formula 1 (Kligler iron agar)

| | |
|---|---|
| Polypeptone peptone | 20.0 |
| Lactose | 10.0 |
| Dextrose | 1.0 |
| Sodium Chloride | 5.0 |
| Ferric Ammonium Citrate | 0.5 |
| Sodium Thiosulfate | 0.5 |
| Agar | 15.0 |
| Phenol Red | 0.025 |
| Final pH 7.4± | |

Formula 2 (Kligler iron agar)

| | |
|---|---|
| Beef Extract | 3 g. |
| Yeast Extract | 3 g. |
| Bacto-Peptone | 15 g. |
| Proteose Peptone | 5 g. |
| Lactose | 10 g. |
| Dextrose | 1 g. |
| Ferrous Sulfate | 0.2 g. |
| Sodium Chloride | 5 g. |
| Sodium Thiosulfate | 0.3 g. |
| Agar | 12 g. |
| Phenol Red | 0.024 g. |

In addition, triple sugar iron agar is available in formulations such as the following, again depending upon the supplier (formulation given as grams per liter of distilled water):

| Formula 1 (triple sugar iron agar) | |
|---|---|
| Polypeptone Peptone | 20.0 |
| Sodium Chloride | 5.0 |
| Lactose | 10.0 |
| Sucrose | 10.0 |
| Dextrose | 1.0 |
| Ferrous Ammonium Sulfate | 0.2 |
| Sodium Thiosulfate | 0.2 |
| Phenol Red | 0.025 |
| Agar | 13.0 |
| Final pH 7.3± | |

| Formula 2 (triple sugar iron agar) | |
|---|---|
| Beef Extract | 1 g. |
| Proteose Peptone No. 3 | 12 g. |
| Lactose | 10 g. |
| Saccharose | 10 g. |
| Dextrose | 1 g. |
| Sodium Chloride | 5 g. |
| Agar | 15 g. |
| Phenol Red | 0.025 g. |

These prior art media are very similar save that triple sugar iron agar contains a third sugar, sucrose, which produces a reaction with certain bacteria.

In accordance with this invention, Kligler iron agar and triple sugar iron agar can be modified to give an improved and more comprehensive reaction to proteus and providence bacilli by adding to formulations such as above about 1 to 5 grams of L-tryptophane, preferably about 2 to 3 grams, sufficient ferric ammonium citrate, if not already present, to provide at least 0.1 gram of this ferric salt and usually from 0.1 to 1 gram and a very small amount of brom cresol purple, generally no more than about 1.5 to 2.0 milligrams per liter. If another iron salt is present only about 0.1 gram of the ferric ammonium citrate need be used. The amount of brom cresol purple is minimized in order not to obscure the other reactions of the mediums which are known and which are not obscured or interfered with by addition of these ingredients. As indicated above, L-phenylalanine can be added in amounts similar to the amount of tryptophane, typically about 1 to 5 grams.

In each case, the modified Kligler iron agar and the modified triple sugar iron agar of this invention produces all the expected reactions to the various types of bacteria which are susceptible to screening by the prior art formulations of these media. By adding the components of this invention, none of these reactions are obscured or interfered with but an enhanced reaction, i.e., a brown slant, is produced by a more comprehensive number of proteus and providence bacilli. Although it has been found that some of these proteus and providence bacteria which produce a positive reaction with the medium of this invention maintained under slightly acid conditions, will escape identification in the modified formulations of Kligler iron agar and triple sugar agar of this invention, these modified formulations are capable of detecting some strains of proteus and providence which would otherwise fail to produce a reaction with the prior art formulations above.

The addition of brom thymol blue has not been found to be necessary in the preparation of modified lysine iron agar, modified Kligler iron agar, or modified triple sugar iron agar. The color reactions produced by the formulations above appear satisfactory. Nonetheless, it will be understood by those skilled in the art that various color indicators can be employed for cosmetic purposes without departing from the spirit or scope of this invention.

The formulations of this invention as set forth above are illustrative only. The nutrient ingredients which may be used in this culture media may be varied so long as a sufficient nutrition source is available to encourage the growth of the bacteria in the media. Moreover, the proportions of the various ingredients may be varied. It will be understood that the permanent positive identification or proteus and providence bacteria is accomplished by the novel culture media of the instant invention by the formation of a nonmetabolizable complex resulting from the interaction of the acids produced by deamination of tryptophane and phenylalanine, the ferric salt and brom cresol purple. The positive reaction shown as a brown slant is produced merely after incubation of the sample and requires no further treatment or testing. Accordingly, variations in the formulations to accomplish the formation of such a nonmetabolizable complex will be appreciated by those skilled in the art as evidenced by the variations between media such as Kligler iron agar available in different formulations as shown above.

What is claimed is:

1. A bacteria culture medium for identification of proteus and providence bacteria which comprises L-tryptophane, ferric ammonium citrate and brom cresol purple, bacteria nutrient sources and a gelling agent.

2. The bacteria culture medium of claim 1 including as an additional ingredient L-phenylalanine.

3. The bacteria culture medium of claim 1 wherein said solution has a pH of about 6.7.

4. The bacteria culture medium of claim 1 wherein said nutrient ingredients include a peptone and yeast extract.

5. The bacteria culture medium of claim 1 wherein the ingredients are present the following amounts expressed per liter of distilled water:
   a. about 1 to 10 grams/liter of L-tryptophane;
   b. about 0.1 to 1 gram/liter of ferric ammonium citrate;
   c. about 1.5 to 40 milligrams/liter of brom cresol purple.

6. The bacteria culture medium of claim 5 wherein tryptophane is present in amounts of about 1 to 5 grams/liter and including about 1 to 5 grams/liter of L-phenylalanine.

7. A bacteria culture medium for identification of proteus and providence bacteria comprising the following in amounts expressed per liter of distilled water:
   a. about 5 grams/liter of peptone;
   b. about 3 grams/liter of yeast extract;
   c. about 3 grams/liter of L-tryptophane;
   d. about 2 grams/liter of L-phenylalanine;
   e. about 0.5 gram/liter of ferric ammonium citrate;
   f. about 5 milligrams/liter of brom cresol purple;
   g. about 10 milligrams/liter of brom thymol blue; and
   h. agar as a gelling agent, in an aqueous solution having a pH of about 6.7.

8. The bacteria culture medium of claim 7 wherein said peptone is bactopeptone.

9. In a lysine iron agar culture medium comprising a peptone, yeast extract, dextrose, L-lysine, ferric ammonium citrate and brom cresol purple and agar as a gelling agent, the improvement which comprises from adding L-tryptophane in amounts of about 1 to 10 grams/liter.

10. The culture medium of claim 9 wherein said L-tryptophane is present in an amount of about 1 to 5 grams/liter and including L-phenylalanine in an amount of about 1 to 5 grams/liter.

11. The culture medium of claim 10 wherein said L-tryptophane is present in an amount of about 1 to 5 grams/liter, and including l-phenylalanine in an amount of about 1 to 5 grams per liter.

12. In a Kligler's iron agar culture medium comprising a peptone, lactose, dextrose, a ferric salt, sodium thiosulfate, phenol red, and agar as a gelling agent, the improvement which comprises adding L-tryptophane in an amount of about 1 to 10 grams per liter, ferric ammonium citrate in an amount up to 1 gram/liter, and brom cresol purple in an amount of about 1.5 to 2 milligrams per liter.

13. In a triple sugar iron agar culture medium comprising a peptone, lactose, sucrose, dextrose, sodium chloride, phenol red, and agar as a gelling agent, the improvement which comprises adding L-tryptophane in an amount of about 1 to 10 grams per liter, ferric ammonium citrate in an amount of about 0.1 to 1 gram per liter and brom cresol purple in an amount of about 1.5 to 2 milligrams per liter.

14. The culture medium of claim 13 wherein said L-tryptophane is present in an amount of about 1 to 5 grams per liter and including L-phenylalanine in an amount of about 1 to 5 grams per liter.

15. A method of identifying bacteria of the proteus and providence type which comprises incubating an unknown bacteria in the presence of a medium comprising L-tryptophane, ferric ammonium citrate, and brom cresol purple, together with bacteria nutrient ingredients to obtain a nonmetabolizable color complex having a characteristic brown color indicative of the presence of proteus and providence bacteria.

* * * * *